(12) United States Patent
Kumar et al.

(10) Patent No.: US 9,514,417 B2
(45) Date of Patent: Dec. 6, 2016

(54) CLOUD-BASED PLAGIARISM DETECTION SYSTEM PERFORMING PREDICTING BASED ON CLASSIFIED FEATURE VECTORS

(71) Applicant: Google Inc., Mountain View, CA (US)

(72) Inventors: Sanjiv Kumar, White Plains, NY (US); Brian Kernighan, Princeton, NJ (US)

(73) Assignee: Google Inc., Mountain View, CA (US)

( * ) Notice: Subject to any disclaimer, the term of this patent is extended or adjusted under 35 U.S.C. 154(b) by 363 days.

(21) Appl. No.: 14/143,710

(22) Filed: Dec. 30, 2013

(65) Prior Publication Data

US 2015/0186787 A1 Jul. 2, 2015

(51) Int. Cl.
| | | |
|---|---|---|
| *G06F 15/18* | (2006.01) | |
| *G06N 99/00* | (2010.01) | |
| *G06F 17/30* | (2006.01) | |
| *G06Q 10/10* | (2012.01) | |

(52) U.S. Cl.
CPC ....... *G06N 99/005* (2013.01); *G06F 17/30011* (2013.01); *G06Q 10/107* (2013.01)

(58) Field of Classification Search
CPC ............................ G06F 17/274; G06Q 10/107
USPC ...................................................... 706/12, 45
See application file for complete search history.

(56) References Cited

U.S. PATENT DOCUMENTS

| | | | |
|---|---|---|---|
| 6,978,419 B1 | 12/2005 | Kantrowitz | |
| 8,301,640 B2 | 10/2012 | Al Badrashiny et al. | |
| 2005/0060643 A1* | 3/2005 | Glass | G06F 17/241 715/205 |
| 2009/0226872 A1 | 9/2009 | Gunther | |
| 2012/0131015 A1* | 5/2012 | Al Badrashiny | G06F 17/273 707/748 |
| 2012/0254333 A1* | 10/2012 | Chandramouli | G06F 17/27 709/206 |
| 2012/0296637 A1 | 11/2012 | Smiley et al. | |
| 2013/0138428 A1* | 5/2013 | Chandramouli | G06F 17/274 704/9 |
| 2013/0246431 A1* | 9/2013 | Ahuja | G06F 17/30713 707/740 |

OTHER PUBLICATIONS

Ceska, Plagiarism Detection Based on Singular Value Decomposition, 2008, Springer-Verlag, pp. 108-119.*
Lukashenko et al., Computer-Based Plagiarism Detection Methods and Tools: An Overview, 2007, CompSysTech, pp. 1-6.*

(Continued)

*Primary Examiner* — David Vincent
(74) *Attorney, Agent, or Firm* — Fish & Richardson P.C.

(57) ABSTRACT

Plagiarism may be detected, as disclosed herein, utilizing a database that stores documents for one or more courses. The database may restrict sharing of content between documents. A feature extraction module may receive edits and timestamp the edits to the document. A writing pattern for a particular user or group of users may be discerned from the temporal data and the documents for the particular user or group of users. A feature vector may be generated that represents the writing pattern. A machine learning technique may be applied to the feature vector to determine whether or not a document is plagiarized.

20 Claims, 5 Drawing Sheets

(56) References Cited

OTHER PUBLICATIONS

Alzahrani et al., Understanding Plagiarism Linguistic Patterns, Textual Features, and Detection Methods, 2012, IEEE Transactions on Systems, Man, and Cybernetics, pp. 133-149.*

Subroto et al., Plagiarism Detection on the Student Assignment from Internet using Words n-grams Fingerprints, 2008, PARS, pp. 1-4.*

Koppel and Schler, "Authorship Verification as a One-Class Classification Problem," Proceedings of the Twenty-First International Conference on Machine Learning, Jul. 4-8, 2004, 7 pages.

Hoad and Zobel, "Methods for Identifying Versioned and Plagiarised Documents," Journal of the American Society for Information Science and Technology, 54(3):203-215, Feb. 2003.

Meyer zu Eissen and Stein, "Intrinsic Plagiarism Detection," Proceedings of the 28th European Conference on IR Research, ECIR 2006, 565-569.

Parker and Hamblen, "Computer Algorithms for Plagiarism Detection," IEEE Transactions on Education, 32(2):94-99, May 1989.

Potthast et al., "An Evaluation Framework for Plagiarism Detection," Coling 2010: Poster Volume, pp. 997-1005, Aug. 2010.

* cited by examiner

CLOUD-BASED PLAGIARISM DETECTION SYSTEM PERFORMING PREDICTING BASED ON CLASSIFIED FEATURE VECTORS

BACKGROUND

Massive online open courses ("MOOC") are aimed at large-scale courses provided to participants around the world. Because the number of participants can be large, sometimes reaching over tens or hundreds of thousand people, it is difficult for the instructor and/or teaching assistants to identify whether any students have plagiarized any content for their homework or assignments. Many assignments include writing essays or developing computer programs to solve a particular problem. With the increasing popularity of distance education programs, manually sifting through a large number of documents to detect plagiarism is a cumbersome process.

BRIEF SUMMARY

According to an implementation of the disclosed subject matter, a system is provided that includes a database and a feature extraction module. The database may store one or more documents. Each of the documents may be associated with at least one user. The database may be configured to receive a group of documents related to a course. It may receive at least one edit to one of the group of documents by a user. The database may store the at least one edit and at least one time reference corresponding to the time during which the at least one edit was made. Sharing of content between each of the one or more documents may be restricted.

The feature extraction module may be configured to obtain a writing history for at least one user associated with the one of the group of documents. It may determine a writing pattern associated with the one of the group of documents based on the writing history for the at least one user, the at least one edit, and at least one time reference. The feature extraction module may be configured to generate a feature vector for the writing pattern. In some configurations, it may compare the feature vector to at least one other feature vector to generate a similarity score. The at least one other feature vector may correspond to a second at least one user who is not present in the first at least one user. The extraction module may provide an indication of the similarity score. In some configurations, a machine learning technique may be trained on a first set of documents that are known to be plagiarized. The trained machine learning algorithm may be used to classify the feature vector.

In an implementation, a system is provided that includes a database and a processor connected thereto. The database may store one or more documents. Sharing of the documents may be restricted. The processor may be configured to receive an edit to a document stored in the database. It may associate a time reference with the edit to the document and store the edit and the time reference to the database as a document history. The processor may generate a feature vector based on the document history and determine a probability that the document is plagiarized based on a classification of the feature vector by a machine learning technique. In some configurations, the probability may be based on at least one pairwise comparison of the feature vector for the document to at least one other feature vector for a second document in the database. In some configurations, the probability may be based on a comparison of the feature history to an independent signal, wherein the independent signal corresponds to other documents generated by an author of the document stored in the database.

As disclosed herein, a group of documents related to a course may be received. At least one edit to one of the group of documents by a user may be received. The at least one edit and at least one time reference corresponding to the time during which the at least one edit was made may be stored. A writing history may be obtained for the at least one user associated with the one of the group of documents. A writing pattern associated with the one of the group of documents may be determined based on the writing history for the at least one user, the at least one edit, and at least one time reference. A feature vector for the writing pattern may be generated. Sharing of content between each document in the group of documents may be restricted. In some configurations the feature vector may be compared to at least one other feature vector to generate a similarity score. The at least one other feature vector may correspond to a second at least one user who is not present in the first at least one user. An indication of the similarity score may be provided. In some configurations, a machine learning technique may be trained on a first set of documents that are known to be plagiarized. The feature vector may be classified using the trained machine learning algorithm.

In an implementation, an edit to a document stored in a database may be received. A time reference may be associated with the edit to the document. The edit and the time reference may be stored to the database as a document history. A feature vector may be generated based on the document history. A probability that the document is plagiarized may be determined based on a classification of the feature vector by a machine learning technique. The probability may be based on at least one pairwise comparison of the feature vector for the document to at least one other feature vector for a second document in the database. In some instances, the probability may be based on a comparison of the feature history to an independent signal, wherein the independent signal corresponds to other documents generated by an author of the document stored in the database.

The disclosed implementations may be useful to detect plagiarism in a MOOC. Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
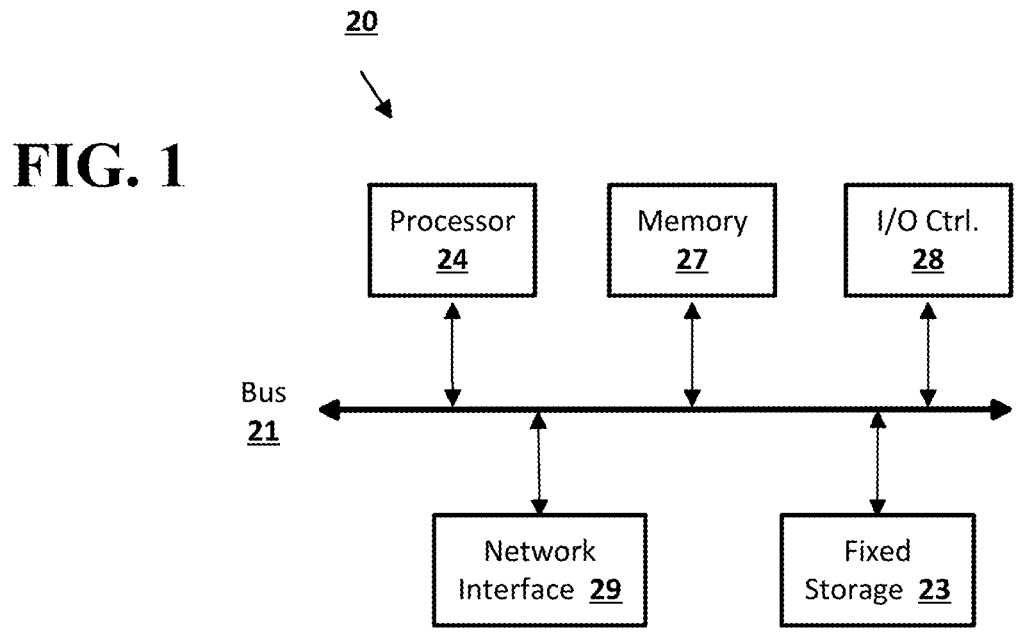
FIG. 1 shows a computer according to an implementation of the disclosed subject matter.

Three components are disclosed that in combination provide detection of plagiarized content. The first component is a cloud-based platform for document writing or computer program development that allows restricted sharing and maintains records of changes. The records of changes or edits made to a document on the cloud-platform may include a time that a change was made. A second component is a feature extraction module which is based on a writing pattern for a user and incremental content addition as will be described below. The third component is a machine-learning based scheme that predicts which pairs or groups of documents have similar contents indicating plagiarism.

Each time a change is made to a document on the cloud-based platform, the change and time may be incrementally recorded. Once an assignment is submitted for grading, features are extracted based on the stored history of the document. For example, a sequence or distribution of word n-grams over time may be an indicator of document content. Each person typically is associated with a set of words, phrases, or style of writing that may be utilized to uniquely identify the individual. Similarly, for computer programs, a distribution over programming language-dependent keywords and their relative orders may be computed. A variety of features in addition to, or instead of, n-grams or programming dependent keywords may be extracted from a document. For example, hashes may be generated from the text content and the hashes may be classified by a machine trained on hashes derived from works known to be plagiarized. Variable-invariant features may be extracted for computer programs or essays to prevent variable swapping or synonym swaps from eluding detection. For example, a synonym swap may refer to replacing a word in a sentence with a second word that does not alter the meaning of the sentence. For example, a user may change the sentence, "Alan turned the wheel" to "Alan rotated the tire" as part of a synonym swap.

Changes in the distribution of words over two time periods may be computed according to an implementation to capture temporal features for each document. The duration of a change and the extent to which content is modified may be factored into whether or not a document has been plagiarized. For example, a cut and paste operation or a systemic change such as renaming a variable may be an indication that an individual has plagiarized a portion of an essay or computer code. An angle between normalized feature vectors or Jaccard (normalized set intersection) similarity may be used to determine a similarity between a pair of documents. Other similarity measures in addition to, or instead of cosine or Jaccard similarity may be used according to implementations disclosed herein, such as histogram intersection or chi-square distance. In an implementation, groups of documents that are similar may be detected (e.g., to detect group plagiarism) using a clustering technique such as hierarchical agglomerative clustering, graph-based spectral clustering, topic-models-based clustering, etc. If the similarity between any pair of documents is above a certain threshold, the degree of similarity may indicate plagiarism in one or both of the documents and the document(s) may be flagged for human verification. A number of visualization techniques can be used that display parts or all of documents that match for easy verification In an implementation, an example of which is provided in FIG. 3, a system is provided that includes a database 310. The database 310 may store one or more documents for two or more courses 312, 314. The database 310 may be configured to restrict sharing of content (e.g., text, code, pictures, etc.) between documents. For example, within the system, content from one document may not be allowed to be copied to or otherwise shared with another document. Each of the documents stored on the database 310 may be associated with at least one user. For example, a user may access the system and be presented with a user interface that allows the user to create a document. Upon the user doing so, the database may create a record or document history 316 for the document. The record 316 may include changes that are visible to the user such as new lines of code, edits, new or edited words, etc. The record 316 may contain information that is not visible to the user. For example, the record 316 may be associated with or contain the time at which any changes or additions to the document are made. It may contain an indication of what specifically was changed or added to the document. For example, it may indicate that a paragraph with 200 words was added at a particular time. It may contain a count of the words utilized and/or an n-gram. Thus, mathematical representations, time references, and/or other indicators of features associated with the document may be contained in the record 316 for the document stored in the database and may not be visible to the user or author of the document.

The database 310 may be configured to receive a group of documents 312, 314 related to a course. For example, an instructor for a course may assign an essay. Each of the students may cause a document to be stored in the database 310 for the essay assignment. Each of the documents may be associated with the course. For example, the students may provide an indication that the document is for the course by entering in a course number and/or an assignment code. The system may prompt a user to enter such information before or subsequent to the user electing to create a document. In some configurations, the course instructor may create a template document for the assignment that is populated to an account associated with each student. When a student accesses an account, the student may find the template document and begin work on the essay.

The database 310 may receive edits to the group of documents by a user (i.e., a student). The group of documents may refer to documents related to a specific course and/or an assignment for that course. Although described here in the context of one document per student, the system may be configured to allow multiple users to work on a single document for group projects. For example, a user may create a document for an assignment and elect to share the document with one or more other individuals. An indication of the sharing may be a part of the record created in the database 310 for the document. Edits made to a document and a time reference corresponding to when the edit was made may be stored in the database 310. For example, a user inserting a paragraph may be associated with a time at which the paragraph was inserted into a document. An indication of the content of the paragraph may also be stored to the database 310. The indication may be a mathematical representation of the paragraph such as a matrix or a vector.

Figure 3:
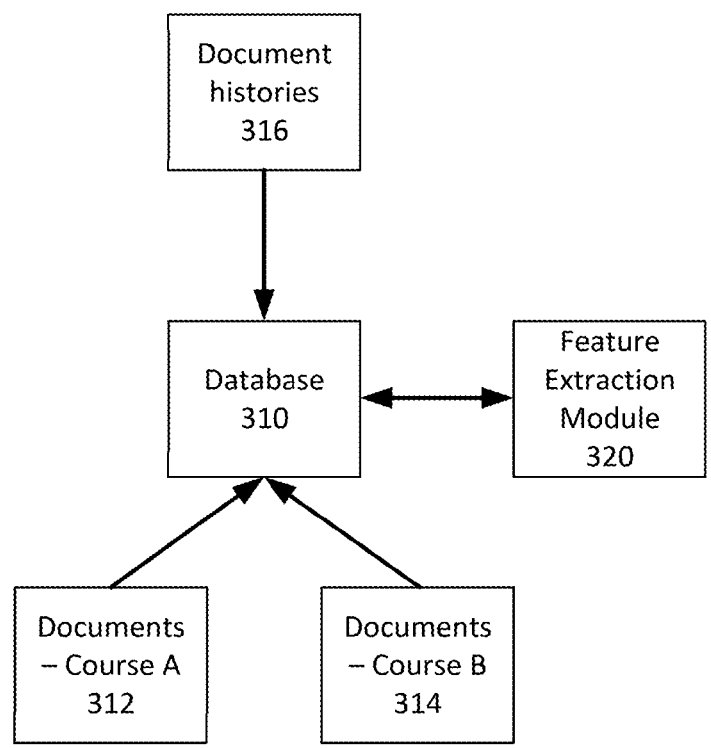
FIG. 3 is an example system for generating a feature vector for a writing pattern according to an implementation.

The system may include a feature extraction module 320 such as the one shown in FIG. 3. The feature extraction module may be a computer system or a portion of a computer system including a processor configured to perform the module's functions, or similar. The feature extraction module 320 may obtain a writing history for the one or more users associated with the one of the group of documents. For example, the feature extraction module 320 may determine if a user has submitted and/or created any other documents in the database 310. If the user has other documents stored to the database, the feature extraction module 320 may determine a writing pattern for each of the user's documents. For example, it may determine a distribution of words (e.g., n-grams) that the user has used in each of the other documents stored to the database. Term frequency inverse document frequency ("Tf-idf") may be applied to the extracted features to remove or reduce the influence of common words such as "a" or "the" from the user's n-gram. The feature extraction module 320 may determine a writing pattern associated with the document based on the writing history for the user, an edit made to the document, and/or at least one time reference. If the user does not have any other documents in the database 310 then the feature extraction module may determine a writing pattern for the user based on the single available document, such as by analyzing edits and corresponding time references for the document. A feature vector may be generated for the writing pattern for each user.

As an example, a feature extraction module may determine a distribution of words (e.g., n-grams) for a user for any document written by the user that is stored in the database. The distribution of words may be a count for every word that is in the documents (i.e., there may be 100 "the" or 1 "agape"). The database may have a temporal history of edits for each of the documents written by the user. The feature extraction module may generate a histogram of the distribution of words written over time based on the temporal history and the count of words. The histogram may be a signal or represented as a feature vector which may be classified according to a trained machine learning algorithm.

The feature vector for a first user may be compared to a feature vector for one or more other users. For example, the feature vectors for students of a course may be compared to one another in a pairwise fashion. An indication of the similarity between the feature vectors may be provided. As stated earlier, a similarity score for a feature vector to one or more other feature vectors may be determined using cosine or Jaccard similarity. The features, such as the distribution of words or n-grams, utilized for a pairwise similarity between the first user and one or more other users may be different than the features utilized for a machine learning classification (described below).

According to an implementation, a machine learning technique may be trained on a first set of documents that are known to be plagiarized, and the feature vector may be classified using the trained machine learning algorithm. For example, writing patterns based on features extracted from a set of documents that have been known to be plagiarized may be obtained and feature vectors representing the plagiarized writing patterns may be generated. For example, training data may be generated by using those documents that are known to be plagiarized, by manually reviewing a set of documents and grouping plagiarized and non-plagiarized works, and/or by generating synthetic sets of documents that employ techniques commonly used for plagiarism (e.g., copying in a whole paragraph, global replacement of a variable, etc.). Writing patterns from non-plagiarized works may be determined and feature vectors may be generated from the non-plagiarized documents based on the writing patterns. The machine learning algorithm may be trained on the feature vectors for both plagiarized and non-plagiarized documents. The trained classifier may be applied to the feature vector extracted from the group of documents described earlier.

Figure 4:
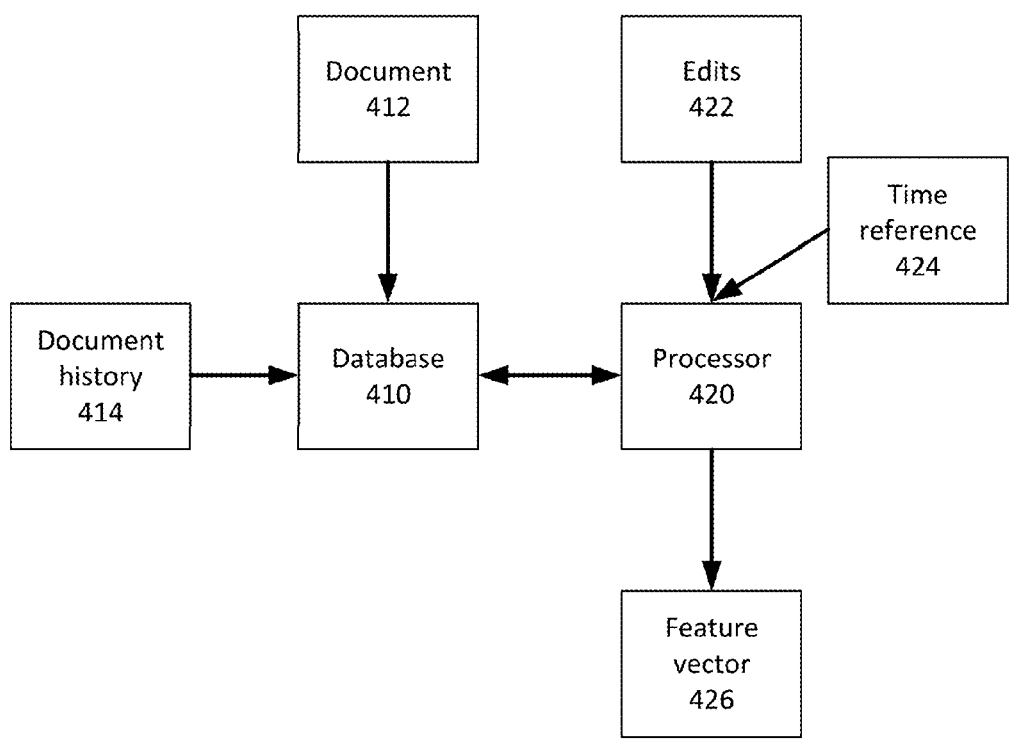
FIG. 4 is an example system for determining a probability that a document is plagiarized according to an implementation.

In an implementation, a system is provided that include a database and a processor connected thereto. An example of the system is provided in FIG. 4. The database 410 may store one or more documents 412 and may restrict sharing of content between documents 412 stored therein. The processor 420 may be configured to receive one or more edits 422 to a document 412 stored in the database 410. For example, a user may open the document 412 and paste in text or other content, type a new paragraph, or the like. A time reference 424 may be associated with the edit 422 to the document 412. The edit 422, the time reference 424 and/or the type of edit may be stored. In an implementation, a hash of the edit, time reference, and/or type of edit may be generated and stored in addition to, or instead of, separately storing the edit, time reference, and/or type of edit. A type of edit may refer to, for example, copy, paste, delete, add, move, search-and-replace, etc. The edit 422 and the time reference 424 may be stored to the database as a document history 414. A feature vector 426 based on the document history 414 may be generated. In some configurations, the feature vector may be stored to the database. A probability that the document is plagiarized may be determined based on a classification of the feature vector by a machine learning technique. As described earlier, the machine learning model, such as a logistical regression model or a support vector machine ("SVM") may be trained on a set of documents known to be plagiarized. Classification of the feature vector by the machine learning technique may result in a ranked list of documents according to the probability that they have been plagiarized. An instructor may set a threshold value of probability of plagiarism above which the instructor may elect to manually review the documents.

Two types of features may be evaluated according to implementations disclosed herein, including independent features and/or pairwise features. Independent features may relate to a user's own writing pattern and typically do not convey or utilize information from other users. Pairwise features can be obtained by comparing the independent features against other users, for example, that are taking the same course. For example, a feature vector for a particular user that reflects the distribution of words used for a document may be compared against feature vectors generated from documents for other users taking the same course. Distances of the nearest matches to the particular user's feature vector may be features themselves. The number of nearest matches selected as features may be predefined or configured as desired. This may assume that the twenty nearest feature vectors to the particular user's feature vector were not plagiarizing. The twenty distance features may be compared to all other documents in the group of documents. Documents that are plagiarized are likely to be close in distance to the twenty distance features. The probability may be based on at least one pairwise comparison of the feature vector for the document to at least one other feature vector for a second document in the database. The probability may be based on a comparison of the feature history to an independent signal (i.e., feature). As stated above, the independent signal may correspond to other documents generated by an author of the document stored in the database.

Figure 5:
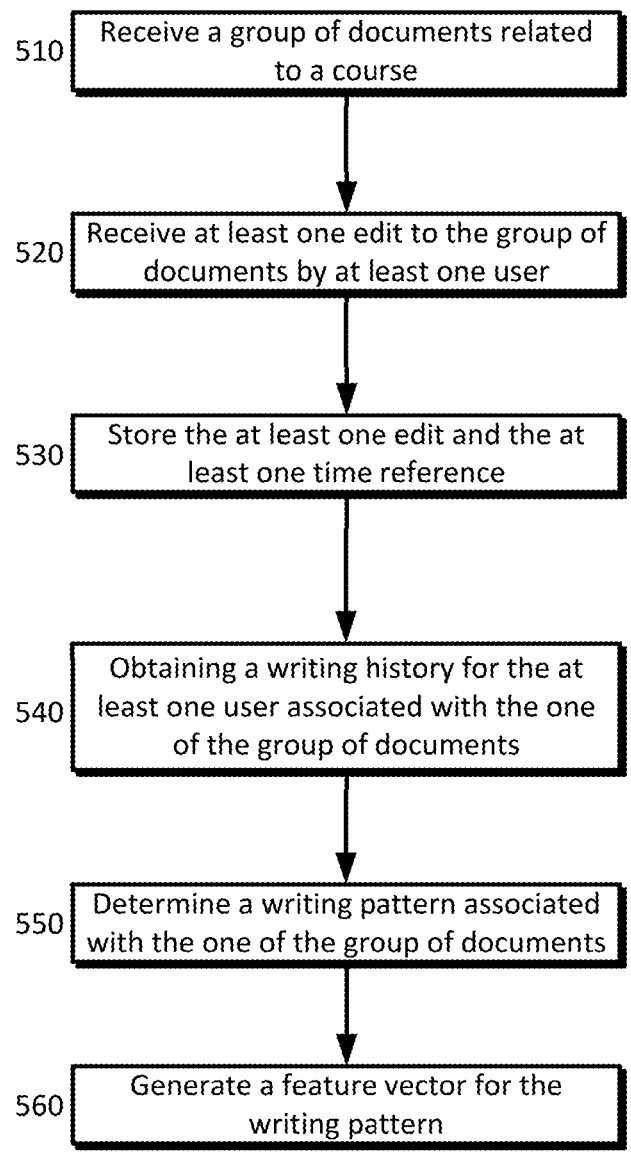
FIG. 5 is an example method for generating a feature vector as disclosed herein.

In an implementation, an example of which is provided in FIG. 5, a group of documents related to a course may be received at 510. For example, a database may store several groups of documents from several different courses. At least one edit to one of the group of documents by at least one user may be received at 520. The at least one edit and at least one time reference corresponding to the time during which the at least one edit was made may be stored at 530 as described earlier. A writing history for the at least one user associated with the one of the group of documents may be obtained at 540. As stated earlier, the writing pattern may be based on other documents authored by a particular user in the database. A writing pattern associated with the one of the group of documents may be determined based on the writing history for the at least one user, the at least one edit, and at least one time reference at 550. A feature vector for the writing pattern may be generated at 560. The feature vector may then be used, for example, to detect potential plagiarism and/or assign a probability of plagiarism as previously described.

Figure 6:
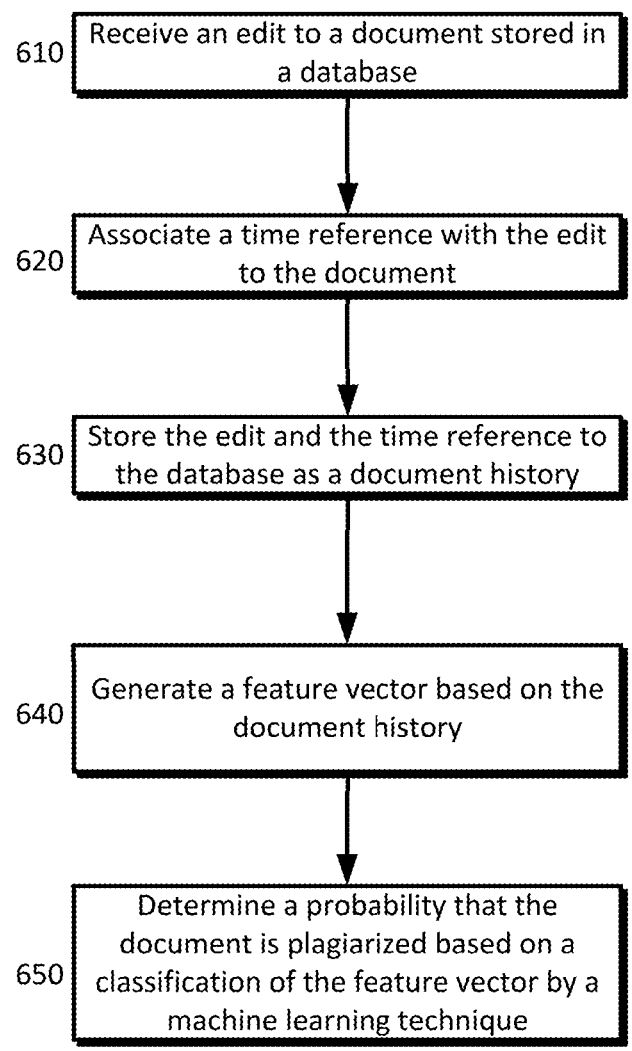
FIG. 6 is an example method for determining a probability that a document is plagiarized according to an implementation disclosed herein.

According to an implementation, an example of which is provided in FIG. 6, an edit to a document stored in a database may be received at 610. A time reference may be associated with the edit to the document at 620. The edit and the time reference may be stored to the database as a document history at 630. A feature vector may be generated based on the document history at 640 and a probability that the document is plagiarized may be determined based on a classification of the feature vector by a machine learning technique at 650 as described above.

Implementations of the presently disclosed subject matter may be implemented in and used with a variety of component and network architectures. FIG. 1 is an example computer system 20 suitable for implementing implementations of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 2.

Many other devices or components (not shown) may be connected in a similar manner, such as document scanners, digital cameras, auxiliary, supplemental, or backup systems, or the like. Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 2:
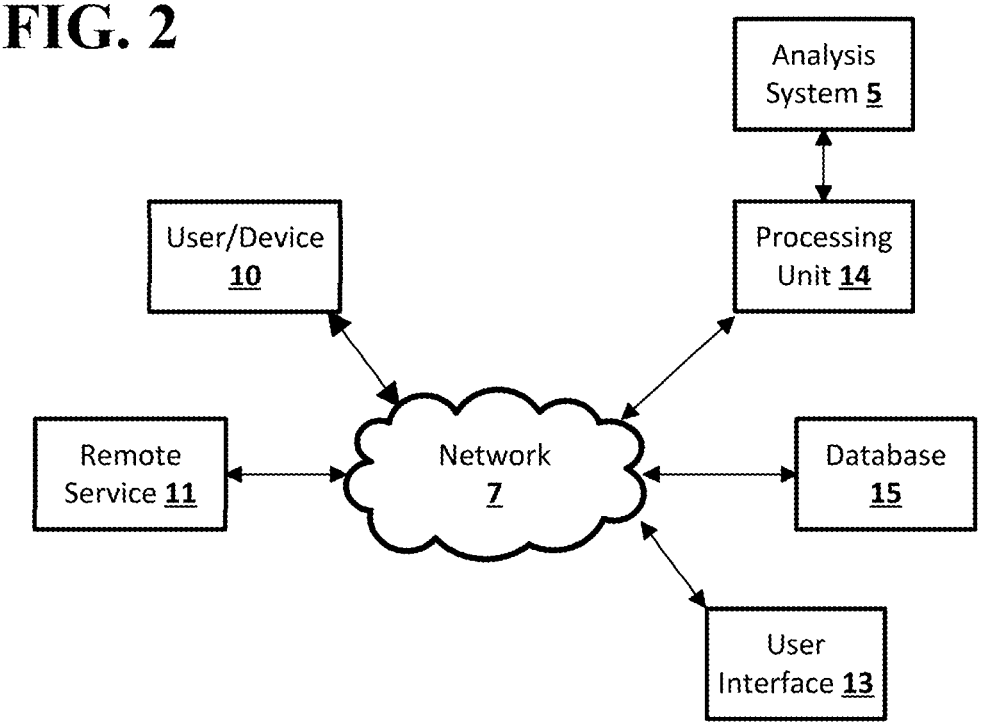
FIG. 2 shows a network configuration according to an implementation of the disclosed subject matter.

FIG. 2 shows an example arrangement according to an implementation of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
   generating training data for training a predictive model using a machine learning technique to estimate a probability that a given document is plagiarized or is not plagiarized, the training data including, for each of a plurality of training documents, a feature vector that includes (i) data referencing a content of an edit to the training document, (ii) data referencing a type of the edit to the training document, (iii) data referencing a time associated with the edit to the training document, and (iv) a label indicating whether the training document is or is not plagiarized;
   training the predictive model using the training data;
   after training the predictive model, identifying a particular document stored in a database;
   receiving data referencing (i) a content of an edit to the particular document stored in the database, and (ii) a time associated with the edit to the particular document;
   generating a feature vector based at least on the data referencing (i) the content of the edit to the particular document stored in the database, and (ii) the time associated with the edit to the particular document; and
   determining a probability that the particular document is plagiarized or is not plagiarized based on classifying the feature vector by the predictive model that is trained using the machine learning technique.

2. The method of claim 1, wherein the type of the edit comprises an insertion or a deletion.

3. The method of claim 1, wherein the type of edit comprises a move.

4. The method of claim 1, wherein the type of edit comprises a replacement.

5. The method of claim 1, comprising automatically generating the plurality of training documents.

6. The method of claim 1, comprising, for each of the plurality of training documents, pre-processing the content of the edit to insert variable-invariant features.

7. The method of claim 6, wherein pre-processing the content comprises substituting a particular term included in the content with a synonym of the particular term.

8. A system comprising:
   a processor configured to execute computer program instructions; and
   a computer storage medium encoded with the computer program instructions that, when executed by the processor, cause the system to perform operations comprising:
   generating training data for training a predictive model using a machine learning technique to estimate a probability that a given document is plagiarized or is not plagiarized, the training data including, for each of a plurality of training documents, a feature vector that includes (i) data referencing a content of an edit to the training document, (ii) data referencing a type of the edit to the training document, (iii) data referencing a time associated with the edit to the training document, and (iv) a label indicating whether the training document is or is not plagiarized;
   training the predictive model using the training data;
   after training the predictive model, identifying a particular document stored in a database;
   receiving data referencing (i) a content of an edit to the particular document stored in the database, and (ii) a time associated with the edit to the particular document;
   generating a feature vector based at least on the data referencing (i) the content of the edit to the particular document stored in the database, and (ii) the time associated with the edit to the particular document; and
   determining a probability that the particular document is plagiarized or is not plagiarized based on classifying the feature vector by the predictive model that is trained using the machine learning technique.

9. The system of claim 8, wherein the type of the edit comprises an insertion or a deletion.

10. The system of claim 8, wherein the type of edit comprises a move.

11. The system of claim 8, wherein the type of edit comprises a replacement.

12. The system of claim 8, wherein the operations comprise automatically generating the plurality of training documents.

13. The system of claim 8, wherein the operations comprise, for each of the plurality of training documents, pre-processing the content of the edit to insert variable-invariant features.

14. The system of claim 13, wherein pre-processing the content comprises substituting a particular term included in the content with a synonym of the particular term.

15. A computer-readable storage device encoded with a computer program, the computer program comprising instructions that, when executed by one or more computers, cause the one or more computers to perform operations comprising:

generating training data for training a predictive model using a machine learning technique to estimate a probability that a given document is plagiarized or is not plagiarized, the training data including, for each of a plurality of training documents, a feature vector that includes (i) data referencing a content of an edit to the training document, (ii) data referencing a type of the edit to the training document, (iii) data referencing a time associated with the edit to the training document, and (iv) a label indicating whether the training document is or is not plagiarized;

training the predictive model using the training data;

after training the predictive model, identifying a particular document stored in a database;

receiving data referencing (i) a content of an edit to the particular document stored in the database, and (ii) a time associated with the edit to the particular document;

generating a feature vector based at least on the data referencing (i) the content of the edit to the particular document stored in the database, and (ii) the time associated with the edit to the particular document; and determining a probability that the particular document is plagiarized or is not plagiarized based on classifying the feature vector by the predictive model that is trained using the machine learning technique.

16. The device of claim 15, wherein the type of the edit comprises an insertion or a deletion.

17. The device of claim 15, wherein the type of edit comprises a move.

18. The device of claim 15, wherein the type of edit comprises a replacement.

19. The device of claim 15, wherein the operations comprise automatically generating the plurality of training documents.

20. The device of claim 15, wherein the operations comprise, for each of the plurality of training documents, pre-processing the content of the edit to insert variable-invariant features.

\* \* \* \* \*